(No Model.)
L. L. BURDON.
MANUFACTURE OF SOLDER LINED SEAMLESS TUBES.
No. 525,676. Patented Sept. 4, 1894.
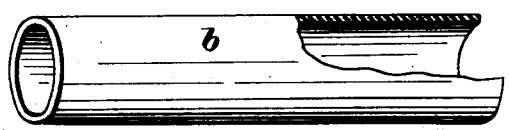
FIG. 1.
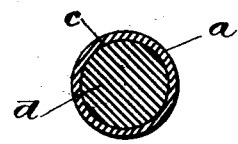
FIG. 5.
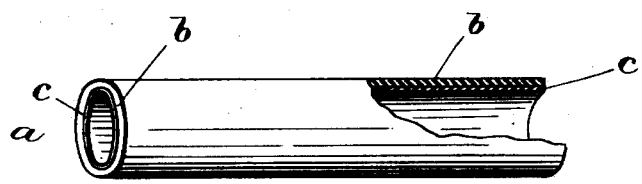
FIG. 2.
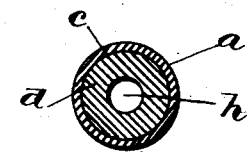
FIG. 6.
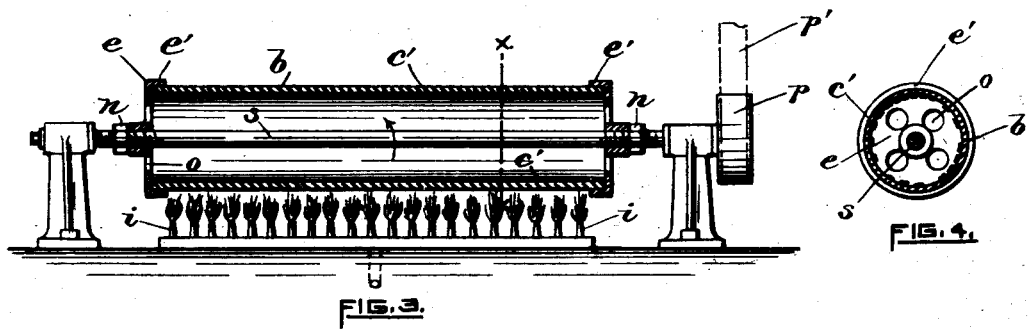
FIG. 3.
FIG. 4.
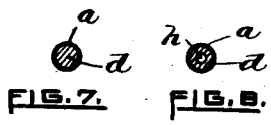
FIG. 7.  FIG. 8.
WITNESSES.
Charles H. Hannigan.
H. E. Carpenter.
INVENTOR.
Levi L. Burdon.
by Remington & Henthorn
Attys.

UNITED STATES PATENT OFFICE.

LEVI L. BURDON, OF PROVIDENCE, RHODE ISLAND, ASSIGNOR TO THE BURDON WIRE AND SUPPLY COMPANY, OF SAME PLACE.

MANUFACTURE OF SOLDER-LINED SEAMLESS TUBES.

SPECIFICATION forming part of Letters Patent No. 525,676, dated September 4, 1894.

Application filed November 20, 1890. Serial No. 371,985. (No model.)

*To all whom it may concern:*

Be it known that I, LEVI L. BURDON, a citizen of the United States, residing at Providence, in the county of Providence and State of Rhode Island, have invented certain new and useful Improvements in the Manufacture of Solder-Lined Seamless Tubes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

In another application for Letters Patent, filed by me in the United States Patent Office, Serial No. 344,010, I have described a new method of producing seamless compound ingots, the outer portion consisting of a solder-lined seamless tube of fine metal formed from a thin disk having one of its faces first covered with a film of solder.

My present invention also relates to ingots of the class just referred to but more especially to the solder-lined seamless shell itself, or tube of fine metal united to and inclosing the filling or core portion of baser metal.

The invention consists in lining or covering the interior surface of the tube with solder after the tube is formed, as for example, the seamless tube itself having the desired size may be produced in any well known manner after which its interior surface is thoroughly cleaned and well boraxed. I then thickly coat the boraxed surface with solder filings and dry it; the tube is next placed in a suitably heated furnace and slowly revolved, thereby re-fusing the solder over the entire inside surface; the ends of the tube are provided with suitable caps which prevent the solder from escaping or flowing out when in a molten state; the tube is finally turned or burred or otherwise treated internally, thereby removing the irregular places and leaving it lined with a film or coat of solder having a uniform thickness. The tube may now receive a properly boraxed core of suitable metal and the whole be then subjected to the influence of heat which acts to re-fuse the solder and unite the shell and core together thus forming a seamless compound ingot, which by suitable mechanism and appliances may be reduced to seamless wire, all as will be more fully hereinafter set forth and claimed.

In the appended sheet of drawings—Figure 1 is a perspective view, in partial section, of the seamless tube before being lined with solder. Fig. 2 is the same after being lined with solder. Fig. 3 shows a manner of mounting the tube and applying the solder. Fig. 4 is a transverse sectional view, taken on line $xx$ of Fig. 3. Figs. 5 and 6 are cross-sectional views of compound ingots, and Figs. 7 and 8 are similar views of compound seamless wire reduced from said compound ingots, respectively.

In the drawings $b$ indicates a seamless tube or shell made of suitably alloyed gold, silver or other metals, as common. The said tube when lined with solder is designated by $a$, the solder lining of the seamless tube being indicated by $c$. In the drawings, Fig. 2, the thickness of the lining $c$ of solder is exaggerated.

The following description refers more particularly to the manner of lining the seamless tube $b$ with solder $c$. The tube itself is first drawn by suitable appliances and methods to the desired size and cut off to the required length; next, its inside surface is covered with a thick coating of borax, followed by covering the boraxed surface with suitable solder in the form say of fine particles, as filings or chips, $c'$. After the solder-holding borax is well dried on to the tube's surface the tube is then subjected to a suitable degree of heat which acts to fuse the particles or pieces of solder, in conjunction with the borax which latter is obviously employed as a flux, and causes the solder to flow over the interior surface of the tube. In Fig. 3, I have represented a manner of lining the tube with solder. The tube $b$ as drawn is on a supported shaft $s$ adapted to be revolved by a traveling belt $p'$ passing around the pulley $p$ secured to said shaft. The shaft as drawn passes through open ends or caps $e$ provided each with a cup-shaped flange $e'$ adapted to receive the ends of the tube; nuts $n$ serving to hold the whole in position upon the shaft. In this arrangement the interior of the tube is first preferably boraxed and covered with fine solder c' before the tube is mounted upon the shaft. Now, upon revolving the tube and at the same time subjecting it to the influence of a suitably heated furnace, or to the heat from a series of burning gas-jets i, Fig. 3, the heat acts to fuse the borax thereby forming a flux with the solder which flows around the surface and produces an unbroken coat or layer c upon the inside of the tube; the openings o of the caps e serving to facilitate the operation, as thereby the workman is enabled to see the interior of the tube. After shutting off the burners the caps e are removed from the roughly lined tube, when finally the latter is burred or turned out by suitable tools thereby removing any superfluous solder and leaving the tube lined with a substantially uniform film or coating c of solder, the thus completed tube being indicated by a, Fig. 2.

In lieu of mounting and revolving the shaft s, &c., horizontally, as shown by Fig. 3, it obviously may be arranged so that one end is higher than the other, or at an angle, in which case by the application of a proper heat to the tube the surplus solder would run out at the lower end of the tube.

In order to produce a compound ingot I take a solder-lined seamless tube a and snugly insert therein a core d of baser metal, the contiguous surfaces of the tube and core having first been suitably prepared and covered with borax to promote the fusion of the solder c; the parts are then suitably arranged in a furnace and subjected to a degree of heat sufficient to fuse the solder uniformly over the entire surfaces; after withdrawing the ingot from the furnace it will be found that the seamless tube and core are united together by solder throughout its length. The compound ingot thus made may be then reduced to seamless compound wire by suitable mechanism, such as swaging, rolling and drawing.

I claim as my invention—

1. The improvement in the manufacture of solder-lined seamless tubes, the same consisting in first forming a seamless tube of suitable metal, next, placing solder in the previously prepared tube, then subjecting the whole while being revolved to a suitable temperature to fuse the solder over the interior surface of the tube.

2. The improvement in the manufacture of solder-lined seamless tubes, the same consisting, first, in forming a seamless tube of suitable metal, then placing solder in the previously arranged and prepared tube, next, fusing the solder over the entire inner surface of the tube by heat applied to the exterior of the tube, and finally burring or reaming out the tube to reduce the lining of solder to a substantially uniform thickness.

In testimony whereof I have affixed my signature in presence of two witnesses.

LEVI L. BURDON.

Witnesses:
GREGORY PHELAN,
GEO. W. ROOSEVELT.